US010531024B2

(12) United States Patent
Augusto et al.

(10) Patent No.: US 10,531,024 B2
(45) Date of Patent: Jan. 7, 2020

(54) PIXEL FOR USE WITH LIGHT HAVING WIDE INTENSITY RANGE

(71) Applicant: Quantum Semiconductor LLC, San Jose, CA (US)

(72) Inventors: Carlos Jorge Augusto, San Jose, CA (US); Pedro Nuno Cruz Diniz, Cerritos, CA (US)

(73) Assignee: Quantum Semiconductor LLC, San Jose, CA (US)

( * ) Notice: Subject to any disclaimer, the term of this patent is extended or adjusted under 35 U.S.C. 154(b) by 0 days.

(21) Appl. No.: 15/566,213

(22) PCT Filed: May 10, 2016

(86) PCT No.: PCT/US2016/031660
§ 371 (c)(1),
(2) Date: Oct. 12, 2017

(87) PCT Pub. No.: WO2016/183091
PCT Pub. Date: Nov. 17, 2016

(65) Prior Publication Data
US 2018/0124338 A1  May 3, 2018

Related U.S. Application Data
(60) Provisional application No. 62/159,943, filed on May 11, 2015.

(51) Int. Cl.
H04N 5/355 (2011.01)
G01J 1/44 (2006.01)
H04N 5/378 (2011.01)

(52) U.S. Cl.
CPC ............ *H04N 5/35563* (2013.01); *G01J 1/44* (2013.01); *H04N 5/378* (2013.01)

(58) Field of Classification Search
CPC ........ H04N 5/35563; H04N 5/378; G01J 1/44
See application file for complete search history.

(56) References Cited

U.S. PATENT DOCUMENTS 6,541,752 B2   4/2003  Zappa et al.
7,115,963 B2  10/2006  Augusto et al.
(Continued)

FOREIGN PATENT DOCUMENTS

WO   2009136285 A2   11/2009

OTHER PUBLICATIONS

Young, Lee W., International Search Report and Written Opinion, PCT/US2016/031660, dated Aug. 12, 2016.
(Continued)

*Primary Examiner* — Twyler L Haskins
*Assistant Examiner* — Angel L Garces-Rivera
(74) *Attorney, Agent, or Firm* — Gavrilovich, Dodd & Lindsey, LLP

(57) ABSTRACT

A light-sensing device includes a pixel array. Multiple pixels in the pixel array each includes pixel electronics. The pixel electronics include low light level electronics in communication with a light sensor and high light level electronics in communication with the same light sensor. The pixel electronics acquire data from the light sensor. During the data acquisition, the pixel electronics can transition between using the high light level electronics to acquire the data and using the low light level electronics to acquire the data.

16 Claims, 12 Drawing Sheets

(56) References Cited

U.S. PATENT DOCUMENTS

| | | |
|---|---|---|
| 8,519,340 B2 | 8/2013 | Frach et al. |
| 8,754,378 B2 | 6/2014 | Prescher et al. |
| 2016/0084964 A1* | 3/2016 | Kimura ................ A61B 6/4241 378/4 |

OTHER PUBLICATIONS

Mohri, Mineko, International Preliminary Report on Patentability and Written Opinion, PCT/US2016/031660, dated Nov. 23, 2017.

* cited by examiner

PIXEL FOR USE WITH LIGHT HAVING WIDE INTENSITY RANGE

RELATED APPLICATIONS

This Application is a U.S. National Stage Application filed under 35 U.S.C. § 371 and claims priority to International Application no. PCT/US2016/031660, filed May 10, 2016, which claims the benefit of U.S. Provisional Patent Application Ser. No. 62/159,943, filed May 11, 2015, which is incorporated herein by reference in its entirety.

FIELD

The present invention relates to light sensors, and more particularly, to the pixels included in light sensors.

BACKGROUND

A variety of technologies make use of light sensors having pixel arrays. In many of these applications it is important for these pixel arrays to provide accurate output regardless of whether these pixels receive only a few photons of light or very intense light. An example of these applications is mapping and/or localization technologies being developed for vehicles such as cars and drones. Vehicle such as drones and self-driving cars use these technologies to build a map of their environment. For instance, these vehicles use these technologies to calculate the distance between the vehicle and any nearby objects.

Mapping and/or localization technologies transmit a light signal that is reflected off objects in the path of the light signal. The reflected light is received at the pixel array and the output of the pixel array is used to determine various features of the object. Since different object reflect light at different intensity levels, the pixels often receive low levels of light or high levels of light. As a result, there is a need for a pixel array that are capable of producing useful data when one or more of the pixels receive light at the rate of a few photons per second and also when those same pixels receive more intense light.

SUMMARY

A light-sensing device includes a pixel array. Multiple pixels in the pixel array each include pixel electronics. The pixel electronics include low light level electronics in communication with a light sensor and high light level electronics in communication with the same light sensor. The pixel electronics acquire data from the light sensor. During the data acquisition, the pixel electronics transition between using the low light level electronics to acquire the data and using the high light level electronics to acquire the data. In some instances, the pixel electronics transition from using the low light level electronics to acquire the data to using the high light level electronics to acquire the data. The transition can occur during the data acquisition.

A method of operating a light-sensing device that includes a pixel array is also disclosed. Multiple pixels in the pixel array each include pixel electronics. The pixel electronics include low light level electronics in communication with a light sensor and high light level electronics in communication with the same light sensor. The method includes acquiring data from the light sensor for the duration of a data acquisition time. Acquiring the data includes changing between using the low light level electronics to acquire the data to using the high light level electronics to acquire the data.

DESCRIPTION

A light-sensing device includes a pixel array. Multiple pixels in the pixel array each include pixel electronics. The pixel electronics include low light level electronics in communication with a light sensor. The low light level electronics are configured to acquire data from the light sensor during a data acquisition cycle. For instance, the low light level electronics can be configured to count the number of photons detected by the light sensor during the data acquisition cycle. The low light level electronics are suitable for use when the light being received by the light sensor is at low intensity levels. During the photon counting process, the light sensor is reset between the detection of different photons at the light sensor. As the intensity of light increases, the reset rate can increase to levels that can exceed 1 GHz. The increased reset rate may result in large levels of power dissipation. Additionally, the increasing intensity can result in a large bitstream associated with the counting process.

The pixel electronics also include high light level electronics in communication with the same light sensor as the low light level electronics. The high light level electronics are also configured to acquire data from the light sensor during the data acquisition cycle. The high light level electronics can measure the intensity level of the light being detected by the light sensor rather than counting individual photons. As a result, the high light level electronics are suitable for use when the light being detected by the light sensor is at higher intensity levels but may lose accuracy at the lower light levels. As a result, the pixel electronics can switch between the use of the low light level electronics to collect data and the use of high light level electronics to collect the data. The switching can occur during a data acquisition cycle to allow the pixel electronics to adjust to the current light conditions at the light sensor. For instance, the pixel electronics can start data acquisition using the low light level electronics and switch to the use of the high light level electronics to complete the data acquisition. As a result, the pixel can provide reliable output at both low light levels and at higher light levels.

Figure 1:
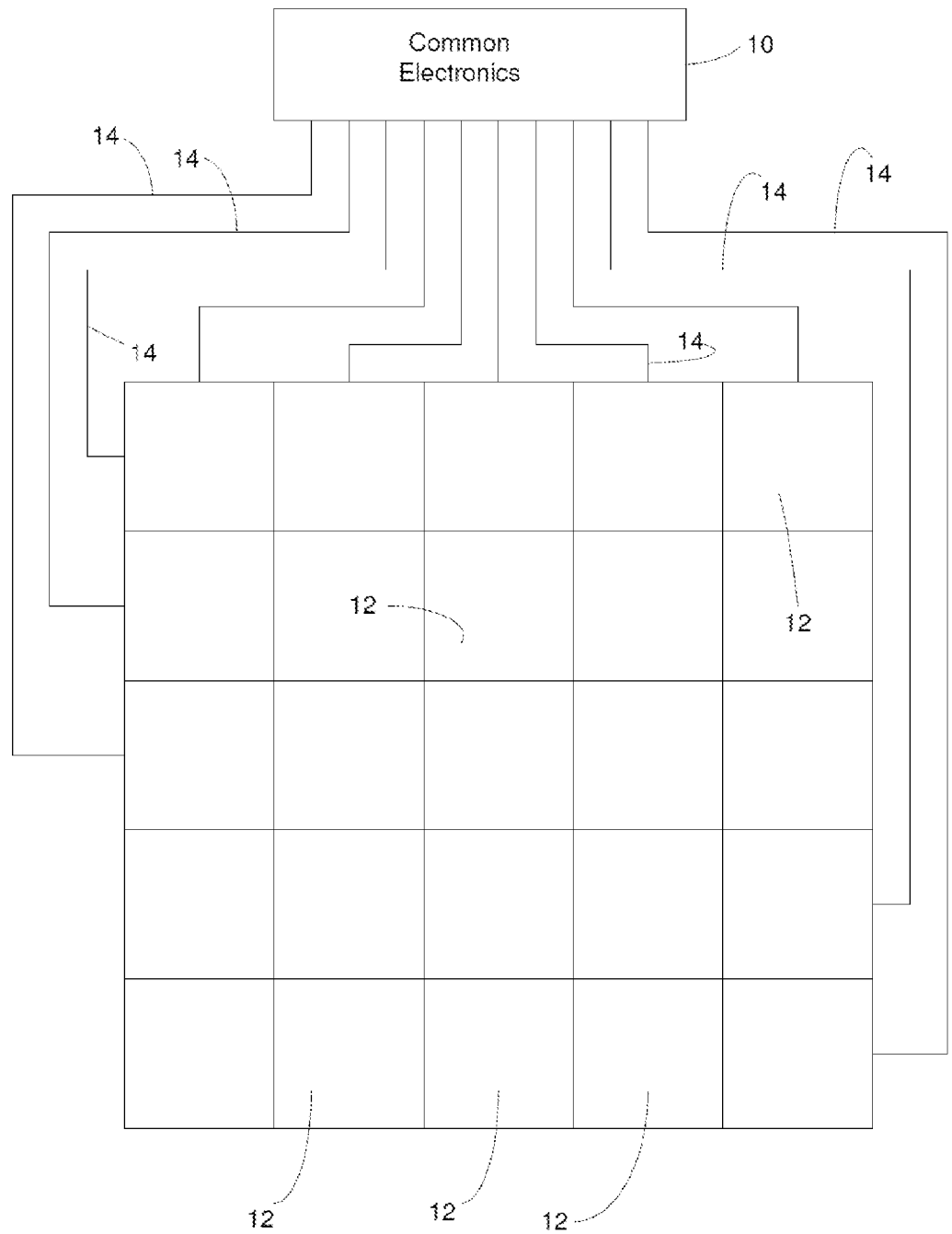
FIG. 1 provides a block diagram of a pixel array.

FIG. 1 provides a block diagram of a pixel array. The pixel array includes common electronics 10 in communication with a pixel array. The common electronics 10 are often positioned at or near the periphery of the pixel array. The pixel array includes pixels 12 arranged in rows and columns. External lines 14 provide electrical communication between the pixels 12 and the common electronics 10. The pixels 12 can each be associated with different pixel electronics (not shown). The pixel electronics are typically associated with a single pixel 12 and are localized at the associated pixel 12. A portion of the external lines 14 can be in communication with the pixel electronics for a single pixel 12 and/or a portion of the external lines 14 can be in communication with the pixel electronics for multiple pixels 12. The common electronics 10 are common to multiple pixels 12 in that the common electronics 10 can operate multiple different pixels 12 and/or receive and process data from multiple different pixels 12.

The pixel array can be included in a sensor such as an active pixel sensor (APS) array, an active pixel sensor imager, active pixel image sensor and/or an image sensor. In some instances, the pixel array is included in a CMOS sensor. As noted above, example applications for the sensor include mapping technologies (i.e. 3D image sensing). However, the sensor can be use in other applications including, but not limited to, 2D image sensing and photonic communications.

Figure 2:
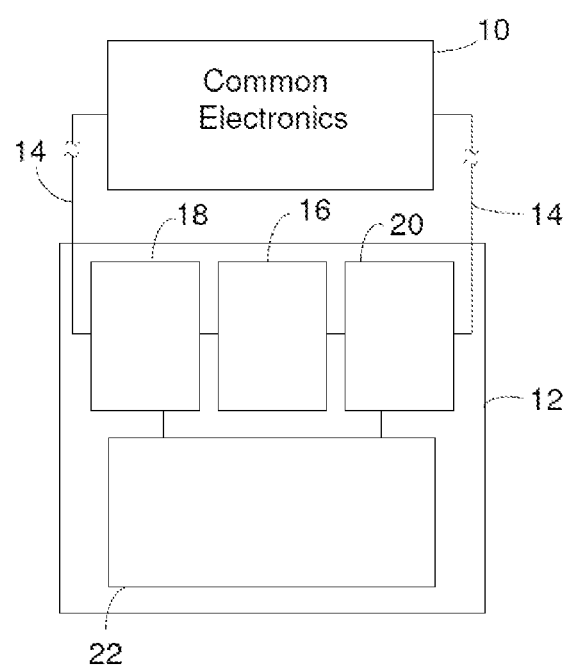
FIG. 2 is a block diagram of the pixel electronics for a pixel in a pixel array.

FIG. 2 is a block diagram for the pixel electronics of a single pixel 12. The pixel 12 includes a pixel controller 16 in communication with a low light level electronics 18 and high light level electronics 20. The low light level electronics 18 and the high light level electronics 20 are each in communication with a light sensor 22. The light sensor 22 receives light during operation of the pixel 12. In some instances, the light sensor 22 converts the received light signals to an electrical signal. Suitable light sensors 22 include, but are not limited to, Photo-Diodes (PDs), Avalanche Photo-Diodes (APDs), and Photo-Transistors. The low light level electronics are suitable for acquiring data from the light sensor 22 when the light being detected by the light sensor is at low intensity levels such that photo-absorption at the light sensor occurs as a sequence of discrete photo-absorption events. In contrast, the high light level electronics are suitable for acquiring data from the light sensor 22 a higher light levels such as sunlight. The low light level electronics 18 can be, include, consist of, or consist essentially of a digital circuit. The high light level electronics 20 can be, include, consist of, or consist essentially of an analog circuit.

During operation of the pixel 12, the common electronics 10 prepare the pixel 12 for a data acquisition cycle where data is acquired from a light sensor 22. The pixel preparation can also be considered reset of the pixel. After preparation of the pixel 12, the pixel 12 is used for the data acquisition. For instance, if the pixel array is included in an imaging device such as a camera, the pixel 12 is used for image acquisition. At the start of the data acquisition, the controller uses the low light level electronics 18 to collect data from the light sensor 22 and makes that data accessible to the common electronics 10 over one or more communications lines. If the collected data indicates that one or more intensity conditions have been satisfied, the pixel controller 16 switches from using the low light level electronics 18 to collect the data to using the high light level electronics 20 to collect the remaining data. When the pixel controller 16 switches from using the low light level electronics 18 to the high light level electronics 20, the pixel controller 16 can disable the low light level electronics 18 so that the data is collected using only or using essentially only the high light level electronics 20. In some instances, the satisfaction of the one or more intensity conditions indicates that the light detected by the light sensor 22 has exceeded an upper intensity level. In these instances, the pixel controller 16 switches from using the low light level electronics 18 to using the high light level electronics 20.

After switching from the low light level electronics 18 to the high light level electronics 20, the use of the high light level electronics 20 to collect the data continues until one or more termination conditions have been satisfied. In some instance, satisfaction of the one or more termination conditions indicates that the total time for the data acquisition process has exceeded a time limit such as the data acquisition time. For instance, when the pixel array is included in an imaging device such as a camera, the time limit can be equal to the image acquisition time or the time the shutter is open (shutter speed or shutter window). If the one or more intensity conditions are not satisfied before the one or more termination conditions are satisfied, the pixel controller 16 does not switch to the high light level electronics before termination of the data acquisition. As a result, the entire data acquisition occurs with the low light level electronics 18. The data acquisition time need not be constant for each data acquisition cycle. For instance, changing the shutter speed of a camera can change the data acquisition time. In a video stream, changing the frame-rate can also change the data acquisition time and/or the shutter speed and accordingly change the data acquisition time. After or concurrently with termination of the data acquisition, the collected data is transferred to the common electronics 10.

Figure 3:
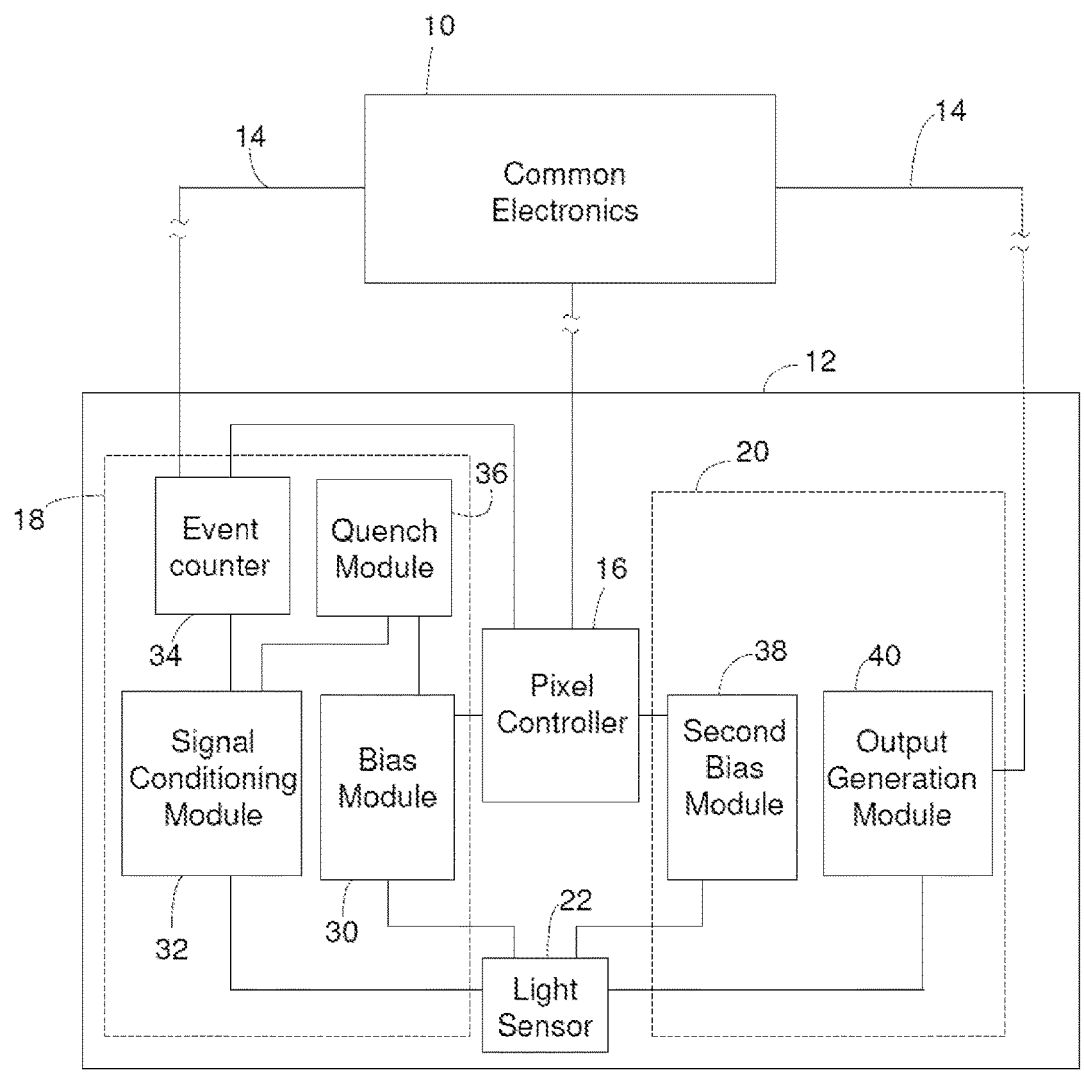
FIG. 3 is block diagram of an example of the pixel electronics of FIG. 2.

FIG. 3 is block diagram of an example of the pixel electronics of FIG. 2. The low light level electronics 18 include a bias module 30 in electrical communication with the pixel controller 16 and the light sensor 22. The low light level electronics 18 also include a signal-conditioning module 32 in electrical communication with the light sensor 22. The low light level electronics 18 also include an event counter 34 and a quench module 36 that are each in electrical communication with the signal-conditioning module 32. The event counter 34 is in electrical communication with one or more external lines 14. The quench module 36 is also in electrical communication with the bias module 30.

The high light level electronics 20 include a second bias module 38 in electrical communication with the light sensor 22. The high light level electronics 20 also include an output generation module 40 in electrical communication with the light sensor 22. The output generation module 40 is in electrical communication with one or more external lines 14.

Figure 4:
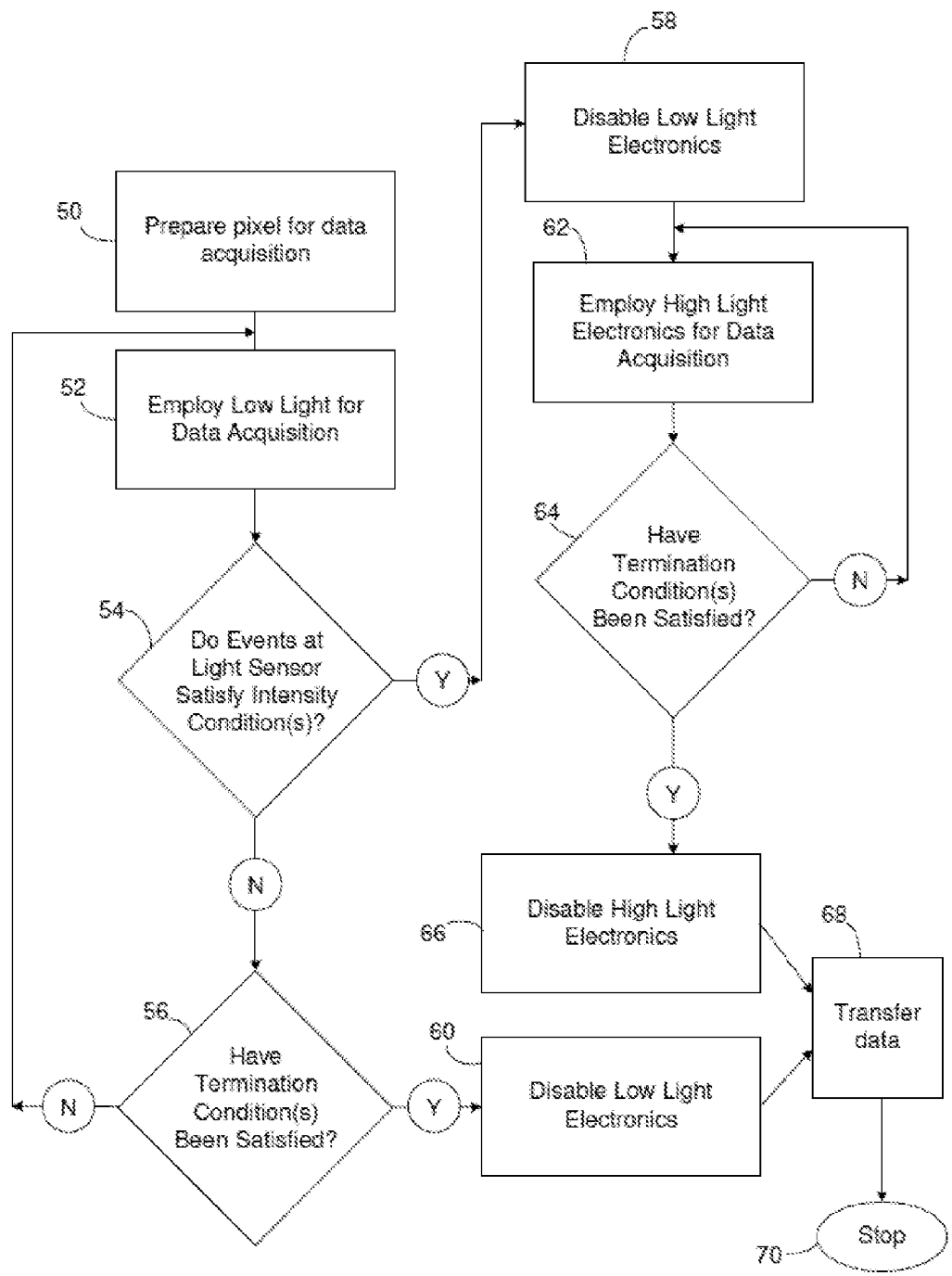
FIG. 4 is a flow diagram for a single data acquisition cycle using a pixel such as a pixel according to FIG. 2 and/or FIG. 3.

FIG. 4 is a flow diagram for a single data acquisition cycle using a pixel 12 such as a pixel according to FIG. 2 and/or FIG. 3. At process block 50, the pixel 12 is prepared for data acquisition. This preparation can be initiated by the common electronics 10. Preparing the pixel 12 can include zeroing the event counter 34. Preparing the pixel 12 can also include placing the bias level desired for operation of the low level electronics across the light sensor 22. For instance, when the light sensor 22 is an Avalanche Photo-Diode (APD), the desired bias condition can be a reverse-biased with a voltage that exceeds the breakdown voltage (Geiger mode) of the Avalanche Photo-Diode (APD). In some instance, preparing the light sensor 22 can include quenching of the light sensor 22 before applying the desired bias condition across the light sensor 22. Further, preparing the pixel 12 can include disabling the high light level electronics 20 such that the high light level electronics 20 do not apply a potential to the anode of the light sensor 22.

Data acquisition begins at process block 52 where the low light level electronics 18 are used to measure detection of photons at the light sensor 22. For instance, the pixel controller 16 operates the bias module 30 such that the bias module 30 applies a target bias level across the light sensor 22. When the light sensor 22 detects a photon, the signal-conditioning module 32 receives a signal indicating detection of a photon at the light sensor 22. The signal-conditioning module 32 passes the received signal on to the event counter 34 and the quench module 36 at a voltage and polarity that is appropriate for the event counter 34 and the quench module 36. In response to receipt of the signal from the signal conditioning module 32, the event counter 34 adds one to the count that is currently being tracked by the event counter 34. As a result, the event counter 34 uses signal from the signal-conditioning module 32 to count the number of photons detected by the light sensor 22. The common electronics 10 can use the one or more external lines 14 to retrieve the number of photons detected by the light sensor 22 from the event counter 34.

As noted above, the quench module 36 also receives the signal from the conditioning module 32. In response to the receipt of this signal, the quench module 36 employs the bias module 30 to quench the light sensor 22. For instance, the quench module 36 can use the bias module 30 to short the light sensor 22. After quenching of the light sensor 22, the bias module 30 is employed to re-apply the bias across the light sensor 22 and the light sensor 22 is ready to detect the next photon. The quenching the light sensor 22 can decrease the delay that occurs between the light sensor 22 detecting one photon and being ready to detect the next photon.

At decision block 54, a determination is made whether one or more intensity conditions have been satisfied. For instance, data generated by the low light level electronics 18 can be compared to one or more intensity conditions. Example intensity conditions include conditions that set a limit on the intensity of light detected by the light sensor 22, a limit on the number of photons detected by the light sensor 22, a limit on the number of photons detected by the light sensor 22 in a particular time frame, a limit on the number of photons between events. Accordingly, satisfaction of the one or more intensity conditions can indicate that an intensity limit has been exceeded, a photon number limit has been exceeded, a limit on the number of photons detected in a particular time frame has been exceeded, a limit on the number of photons detected between events has been exceeded. As an example, the event counter 34 can be used to compare data to the intensity condition. For instance, the event counter 34 can have a maximum value to which the event counter 34 can count. When this maximum value has been reached, the event counter 34 can notify the pixel controller 16. An example of this is a counter with an overflow latch. The overflow of this counter can be indicated to the pixel controller 16. Overflow of this counter of this counter would result in a positive determination at decision block 54.

When the determination at decision block 56 is negative, the process flow proceeds to decision block 52 where a determination is made whether one or more termination conditions have been satisfied. Termination conditions indicate when it is suitable to terminate data acquisition by the pixel 12. For instance, satisfaction of the one or more termination conditions indicates that the total time for data acquisition by the pixel 12 has exceeded a data acquisition time. For instance, when the pixel array is included in an imaging devices such as a camera, the data acquisition time can be equal to the image acquisition time, the time the shutter is open (shutter speed or shutter window), "total integration time." Accordingly, when it is determined that the duration of the data acquisition time limit is exceeded, the one or more termination conditions can be considered satisfied and can result in a positive determination at decision block 56. The determination of when the one or more termination conditions have been satisfied can be made by the common electronics 10.

When the determination at decision block 56 is negative, the process flow returns to process block 52. The combination of process block 52, decision block 54, and decision block 56, results in the use of the low light level electronics 18 to acquire data from the light sensor 22 until the one or more intensity conditions are satisfied or until the one or more termination conditions have been satisfied.

When the determination at decision block 54 or decision block 56 is positive, the low light level electronics 18 are disabled at process block 58 or process block 60 where the low light level electronics 18 are disabled. As an example, the pixel controller 16 can operate the bias module 30 such that the bias module 30 does not apply a potential to the anode of the light sensor 22.

The process flow proceeds from process block 58 to process block 62 where the high light level electronics 20 are used for data acquisition. The use of the high light level electronics 20 can be concurrent with or subsequent to disabling the low light level electronics 18. The use of the high light level electronics 20 can be initiated by applying the bias level across the light sensor 22 that is desired for use of the high light level electronics 20. For instance, the pixel controller 16 can operate the second bias module 38 such that the second bias module 38 applies a potential level to the anode of the light sensor 22 that produces the desired bias level across the light sensor 22. When the light sensor 22 is an Avalanche Photo-Diode (APD), the desired bias can be a reverse-bias with a voltage below the breakdown voltage of the Avalanche Photo-Diode (APD). In some instance, the pixel electronics can operate the second bias module 38 such that the applied bias level can be tuned. As a result, in some instances, the pixel electronics can tune the level of applied bias during data acquisition. Additionally or alternately, the pixel electronics can apply different levels of bias across the light sensor 22 during different data acquisitions. In response to the detection of photons at the light sensor 22, the output generation module 40 generates an output electrical signal that indicates the intensity level of the light detected by the light sensor 22 and outputs the electrical signal on one or more of the external line 14. As an example, the output generation module 40 can generate an output electrical signal with a characteristic that is mathematically related to the intensity of the light detected by the light sensor 22. An example of a mathematical relationship between the electrical signal and the intensity of the light detected by the light sensor 22 is that the amplitude, or voltage of the electrical signal can be proportional to the intensity of the light detected at the light sensor 22. The proportionality can be direct, indirect, logarithmic, inverse logarithmic. The common electronics 10 can use the mathematical relationship to determine the intensity of the light detected at the light sensor 22.

At decision block 64, a determination is made whether one or more termination conditions have been satisfied. As noted above, the termination conditions indicate when it is suitable to terminate data acquisition by the pixel 12. For instance, satisfaction of the one or more termination conditions indicates that the total time for data acquisition by the pixel 12 has exceeded a data acquisition time limit. For instance, when the pixel array is included in an imaging device such as a camera, the time limit can be equal to the image acquisition time, the time the shutter is open (shutter speed or shutter window), "total integration time." Accordingly, when it is determined that the duration of the data acquisition time limit is exceeded, the one or more termination conditions can be considered satisfied and can result in a positive determination at decision block 64. The determination of when the one or more termination conditions have been satisfied can be made by the common electronics 10.

A negative determination at decision block 64 would result in a return to process block 62. The result of process block 62 and decision block 64 is that the high light level electronics 20 are used until the one or more termination conditions have been satisfied.

When the determination at decision block 62 is positive, the high light level electronics 20 are optionally disabled at process block 66. For instance, the pixel controller 16 can disable the high light level electronics 20. As an example, the pixel controller 16 can operate the second bias module 38 such that the second bias module 38 does not apply a voltage across the anode of the light sensor 22.

The flow proceeds from process block 60 and process block 66 to process block 68 where the acquired date is transferred to the common electronics 10. For instance, the data acquired by the event counter 34 and the output generation module 40 can be transferred to the common electronics 10. The common electronics 10 can process and combine the data received from the event counter 34 and the output generation module 40 to determine the total intensity of light detected at the photodiode. After or concurrently with the transfer of the acquired data to the common electronics 10, the common electronics 10 can return to process block 50 and prepare the pixel 12 for the next data acquisition cycle. Accordingly, the pixel is prepared before each data acquisition cycle in a series of data acquisition cycles. As an alternative to performing multiple data acquisition cycles, the common electronics 10 or the process flow can stop at block 70 after or concurrently with the transfer of the acquired data to the common electronics 10.

As is evident from the above discussion, the data acquisition occurs for a period of time called the data acquisition time. When overflow of an event counter 34 causes the pixel controller 16 to change from the use of the low light level electronics 18 to the high light level electronics 20, the intensity condition discussed above is effectively a limit on the number of photons that can be detected by the light sensor 22 within the data acquisition time. For instance, when the maximum value of the counter is reached within the data acquisition time, the pixel controller 16 to change from the use of the low light level electronics 18 for data acquisition to the high light level electronics 20. As a result, the intensity condition effectively becomes an upper limit on the photon detection rate.

Figure 5:
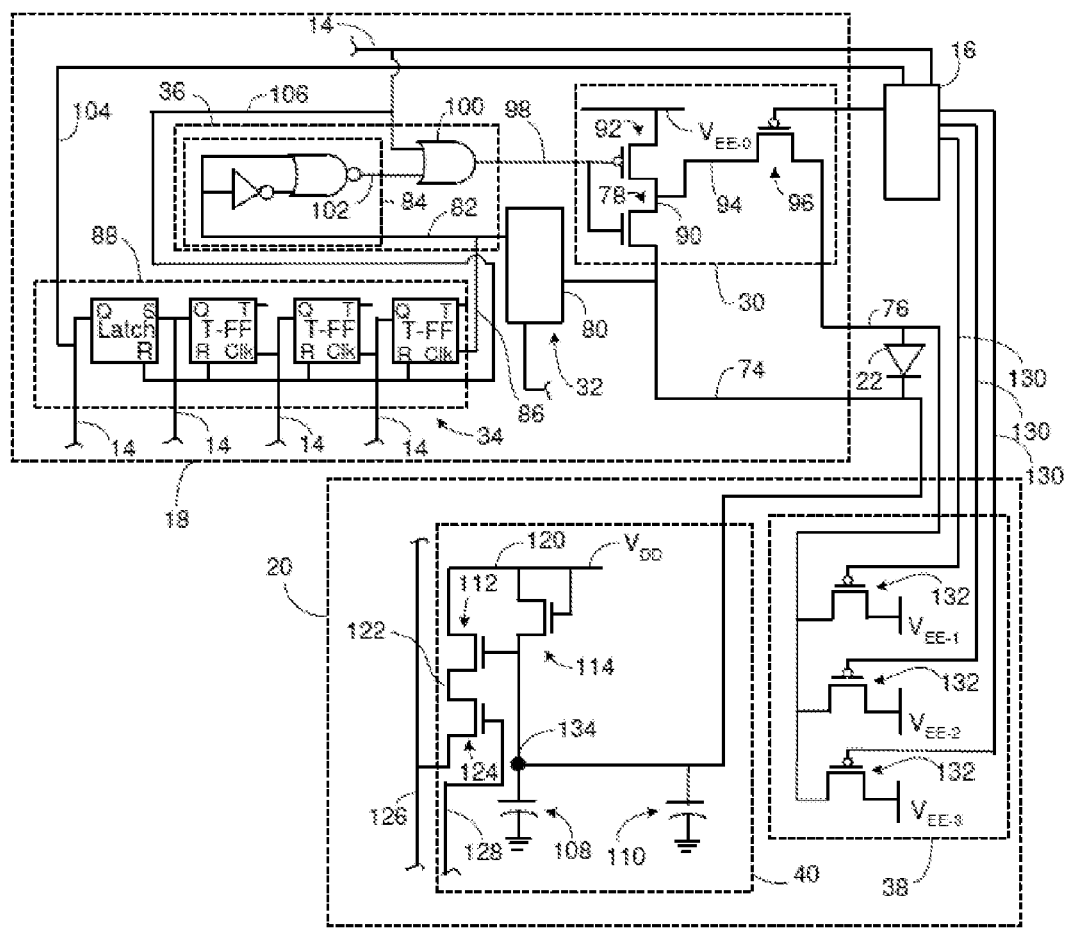
FIG. 5 is a schematic of an example of suitable pixel electronics that include a pixel controller in electrical communication with low light level electronics and high light level electronics.

FIG. 5 is a schematic of an example of suitable pixel electronics that includes a pixel controller 16 in electrical communication with low light level electronics 18 and high light level electronics 20. A cathode line 74 and an anode line 76 each provides electrical communication between the light sensor 22 and the low light level electronics 18 and also between the light sensor 22 and the high light level electronics 20. A suitable pixel controller 16 includes, but is not limited to, a sequential digital logic circuit with combinatorial logic components. The pixel controller can be monolithically integrated with the pixel, which can be on the same substrate of the light-sensor 22, or through the 3D IC integration of a substrate with the light-sensor 22 and an additional substrate containing digital CMOS elements with which pixel controller 16 can be constructed.

The cathode line 74 is in electrical communication with the source of an n-channel transistor 78 and a signal conditioner 80. A conditioner line 82 provides electrical communication between the signal conditioner 80 and the input of a pulse generator 84. A counting line 86 provides electrical communication between the conditioner line 82 and a counter 88. In some instances, the signal conditioner 80 serves as the signal-conditioning module 32 of FIG. 3.

A transistor line 90 provides electrical communication between the drain of the n-channel transistor 78 and the drain of a p-channel transistor 92. The source of the p-channel transistor 92 is connected to a first potential source (not shown) for operation at low light levels. The potential of the low light potential source can be positive or negative and is labeled $V_{EE\text{-}0}$ in FIG. 5. An inverter output line 94 provides electrical communication between the transistor line 90 and a bias transistor 96. The gate of the bias transistor 96 is in electrical communication with the pixel controller 16. The bias transistor 96 is also in electrical communication with the anode line 76.

An inverter input line 98 provides electrical communication between the gate of the n-channel transistor 78, the gate of the p-channel transistor 92, and the output of an OR gate 100. A pulse output line 102 provides electrical communication between the pulse generator 84 and an input of the OR gate 100.

An overflow line 104 provides electrical communication between the counter 88 and the pixel controller 16. The counter 88 illustrated in FIG. 5 can serve as the event counter 34 of FIG. 3. The illustrated counter 88 is a 3-bit asynchronous ripple counter with overflow latch and 3 T-type Flip-Flops although other counters can be used. Examples of other suitable counters include, but are not limited to, synchronous counters using D-type and/or JK-type flip-flops, Johnson counters, Gray-code counters, and shift-register-based counters. The illustrated counter 88 is in electrical communication with one or more external lines 14 that can be column that the common electronics 10 can use to access the number of photons counted by the counter 88. In some instances, the one or more external lines 14 in electrical communication with the counter 88 are column lines.

A reset line 106 provides electrical communication between the pixel controller 16, an input of the OR gate 100, and the counter 88. An external line 14 is in electrical communication with the reset line 106.

The cathode line 74 is in electrical communication with a first polarized capacitor 108 to ground that can be a floating diffusion, a second polarized capacitor 110 to ground, the gate of a first transistor 112 and a second transistor 114. A potential supply line 120 provides electrical communication between the drain of the first transistor 112 and the drain of the second transistor 114 and the gate of a second transistor 114. A second transistor line 122 provides electrical communication between the source of the first transistor 112 and the source of a read transistor 124. The drain of the read transistor 124 is in electrical communication with an external line 14 that can be a column bus 126. The gate of the read transistor 124 is in electrical communication with an external line 14 that can be a row selector 128. Accordingly, the common electronics 10 can turn the read transistor 124 on and off.

The potential supply line 120 is connected to a positive potential source (not shown) such as the positive source for the transistors in the pixel array. In some instances, the positive source is commonly noted as $V_{DD}$ as shown in FIG. 5. Since the cathode line 74 is connected to the cathode of the light sensor 22, the cathode of the light sensor 22 is held at the potential of the positive source.

Three different gate lines 130 each provide electrical communication between the pixel controller 16 and a gate of one of three different bias selection transistors 132. The source of each bias selection transistor 132 is in electrical communication with a different one of several second potential sources (not shown). The potential of the second potential sources is labeled $V_{EE-1}$, $V_{EE-2}$, and $V_{EE-3}$ in FIG. 5. The second potential sources can have a positive or negative potential but the potential value is less than the potential value of the positive source. The potential values of the second potential sources can each be different. In some instances, the potential value for each of the second potential sources is greater than the potential of the low light potential source (labeled $V_{EE-0}$). For instance, $V_{EE-0}$ can be the most negative potential and $V_{EE-1}$, $V_{EE-2}$, $V_{EE-3}$, can be between $V_{EE-0}$ and $V_{DD}$. The drain of each bias selection transistor 132 is in electrical communication with the anode line 76. As a result, the pixel controller 16 can select the potential applied to the anode line 76 by turning on the one or more bias selection transistors 132 that result in the desired level of potential being applied to the anode line 76. Accordingly, the pixel controller 16 can tune the potential applied across the light sensor 22 during operation of the pixel 12.

As noted in FIG. 4, before data acquisition occurs, the pixel 12 is prepared for data acquisition. To prepare for data acquisition, the potential of the positive source (labeled $V_{DD}$ in FIG. 5) is applied to the cathode line 74 and accordingly to the cathode of the light sensor 22. For instance, the common electronics 10 can turn the read transistor 124 on for a period of time sufficient to allow charge stored at node 134 (e.g., a floating diffusion) to drain such that the potential of the positive source is applied to the cathode line 74. Once the potential of the positive source is applied to the cathode line 74, the common electronics 10 can turn the read transistor 124 off. This turning on and off of the read transistor 124 can be a part of a prior data transfer from the pixel 12 to the common electronics 10 rather than part of the pixel preparation. Alternately, the turning the read transistor 124 can be a part of the pixel preparation.

The pixel preparation can also include quenching of the light source. For instance, the common electronics 10 can generate a digital-valued pulse consisting of a first transitions from logic value '0' to logic value '1' followed by a second transition from logic value '1' to logic value '0' onto the external line 14 that is in electrical communication with the reset line 106. The digital-valued pulse on the reset line 106 causes the OR gate 100 to output a digital-valued pulse on the inverter input line 98. The digital-valued pulse on the inverter input line 98 turns OFF the p-channel transistor 92 and turns on the n-channel transistor 78. While the n-channel transistor 78 is in the on state, the potential of the cathode line 74 is also applied to the anode line 76. As a result, an electrical short is created across the light sensor 22 and the light sensor 22 is quenched. As will become evident below, when the reset line 106 returns to a digital logical zero, the inverter input line 98 returns to a digital logical zero. As a result, the p-channel transistor 92 returns to the ON state and the n-channel transistor 78 returns to the OFF state.

The pixel preparation can also include forming a bias level across the light sensor 22 that is desired for the operation of the low light level electronics 18. For instance, in response to the receipt of the logical one on the reset line 106, the pixel controller 16 can turn on the bias transistor 96. The p-channel transistor 92 will be on and the n-channel transistor 78 will be off as a result of the reset line 106 returning to a logical zero. As a result, the potential of the low light potential source (labeled $V_{EE-0}$ in FIG. 5) is applied to the anode line 76 and to the anode of the light sensor 22. Since the potential of the positive source (labeled VDD in FIG. 5) is applied to the cathode of the light sensor 22 and the potential of the low light potential source is applied to the anode of the light sensor 22, the bias level desired for operation of the low light level electronics 18 is applied across the light sensor 22. When the light sensor 22 is an Avalanche Photo-Diode (APD), the applied bias can be a reverse-biased with a voltage that exceeds the breakdown voltage of the Avalanche Photo-Diode (APD).

The pixel preparation can also include zeroing the counter 88. For instance, the logical one that the common electronics 10 previously applied to the reset line 106 is also received at the counter 88. The counter 88 can be configured to reset itself in response to the receipt of the logical one on the reset line 106.

The pixel preparation can also include disabling of the high light level electronics 20. For instance, the pixel controller 16 can turn off each of the second transistors 114. Accordingly, the second bias module 38 is not a source of potential on the anode line 76.

After preparation of the pixel 12, the pixel 12 is ready for data acquisition by the low light level electronics 18. During data acquisition by the low light level electronics 18, the light sensor 22 in a particular pixel 12 might or might not detect a photon. When the light sensor 22 detects a photon, the impedance of the light sensor 22 drops with a potential swing at the terminals of the light sensor 22. For instance, the potential of the cathode decreases as a result of the connection of the cathode to the first polarized capacitor 108 and a second polarized capacitor 110. The drop in the potential of the cathode creates a photon detection signal on the cathode line 74.

The signal conditioner 80 is configured to relay the photon detection signal to the conditioner line 82. However, as noted above, the low light level electronics 18 can be, include, consist of, or consist essentially of a digital circuit while the high light level electronics 20 can be, include, consist of, or consist essentially of an analog circuit. As a result, the low light circuit generally operates at lower voltage levels than the high light circuit. Accordingly, in instances where the polarity and/or potential of the photon detection signal are not suitable for processing by the low light level electronics 18, the signal conditioner 80 may alter the polarity and/or potential of the photon detection signal to levels that are suitable for processing by the low light level electronics 18 before the signal conditioner 80 relays the photon detection signal to the conditioner line 82. As a result, in some instances, the polarity and/or potential of the photon detection signal on the conditioner line 82 is different from the polarity and/or potential of the photon detection signal received by the signal conditioner 80. Suitable signal conditioners 80 include, but are not limited to, resistive voltage dividers, capacitor voltage dividers, and charge-pumps.

The counting line 86 communicates the photon detection signal from the conditioner line 82 to the counter 88. The counter 88 adds one to the current count of detected photons. For instance, the illustrated ripple counter 88 can change one bit to record detection of a photon. Additionally, the pulse generator 84 receives the photon detection signal on the conditioner line 82. The pulse generator 84 is configured to output a pulse with a logical value of one in response to the presence of the photon detection signal on the conditioner line 82. For instance, the illustrated pulse generator 84 has a logic inverter connected to an input of a NOR gate. The conditions line is in electrical communication with another input of the NOR gate and also the input of the logic inverter. When the potential of the photon detection signal drops, the NOR gate outputs a pulse with a logical value of one as a result of the delay caused by the logic inverter.

The pulse on the pulse output line 102 is received on an input to the OR gate 100 and causes the OR gate 100 to output a digital-valued pulse with two transition edges, a leading edge with a transition from logic value '0' to logic value '1' followed by a trailing edge with a transition from a logical one to a logical zero, on the inverter input line 98. The leading edge of the pulse turns OFF the p-channel transistor 92 and turns ON the n-channel transistor 78. The trailing edge of the pulse returns the p-channel transistor 92 to the ON state and the n-channel transistor 78 to the OFF state. While the n-channel transistor 78 is on, the potential of the cathode line 74 is applied to the anode of the light sensor 22. As a result, the light sensor 22 is essentially electrically shorted. This short quenches the light sensor 22. When the n-channel transistor 78 returns to the OFF state after passage of the pulse, the light sensor 22 returns to the desired bias level and is and ready to detect the next photon.

As noted above, the data acquisition can terminate without using the high light level electronics to acquire data. In these instances, the data acquisition terminates while the low light level electronics are being used to acquire data. After or concurrently with the one or more termination conditions being satisfied, the common electronics 10 can terminate the data acquisition by turning off the bias transistor 96.

As noted above, the counter 88 has an overflow latch. As a result, use of the low light level electronics 18 to count photons can continue until the counter 88 overflows. When the counter 88 overflows, the counter 88 outputs an overflow signal on the overflow line 104. The pixel controller 16 receives the overflow signal and responds by initiating the transition from the low light level electronics 18 to the high light level electronics 20. Before the transition or concurrently with the transition, the pixel controller 16 can disable the low light level electronics 18. For instance, the pixel electronics can turn off the bias transistor 96. Turning off the bias transistor 96 stops the application of the potential from the low light potential source (labeled $V_{EE-0}$) to the anode line 76 and accordingly to the anode of the light sensor 22. Before the transition or concurrently with the transition, the pixel controller 16 can enable the high light level electronics 20. For instance, the pixel electronics can turn on one or more bias selection transistors 132 that provide a bias across the light sensor 22 that is desired for operation of the high light level electronics 20. In other words, the pixel electronics can select the one or more second potential sources that provide the desired bias level. Under lower light intensity conditions, it may be desirable to select one or more second potential sources that provide an increased bias magnitude (i.e., larger electric field across the light sensor 22) and under higher light intensity conditions, it may be desirable to select one or more second potential sources that provide a lower bias magnitude (i.e., smaller electric field across the light sensor 22). In some instances, where the light sensor 22 is an Avalanche Photo-Diode (APD), the one or more second potential sources are selected to reverse-bias the light sensor 22 with a voltage below the breakdown voltage of the avalanche photodiode.

During operation of the high light level electronics, when the light sensor 22 detects photons, charges are generated at the second polarized capacitor 110 and then transferred to the first polarized capacitor 108 which can be a floating diffusion capacitor where they are stored.

After or concurrently with the one or more termination conditions being satisfied, the common electronics 10 can terminate the data acquisition by turning off any of the bias selection transistors 132 that are in the ON state.

After or concurrently with the termination of the data acquisition, the acquired data can be transferred to the common electronics 10. The common electronics 10 can receive the photon count directly from the counter 88 over one or more of the external lines 14. The photon count may be in a digital format that is readily processed by the common electronics 10.

The common electronics 10 can receive the intensity data from the high light level electronics 20 over the column bus 126. In order to receive the intensity data, the common electronics 10 turn the read transistor 124 on and load the output electrical signal onto the column bus 126. The common electronics 10 can turn on the read transistor 124 by applying a signal to the row selector 128. As a result, the column bus 126 associated with each pixel 12 in the row will carry the output electrical signal from the associated pixel 12. The output electrical signal can be an analog signal. As a result, the common electronics 10 can employ an Analog to Digital Converter (ADC, not shown) such as a column-parallel ADC to convert the output electrical signal to a digital form for processing by the common electronics 10. For high light level electronics 20 having the schematic illustrated in FIG. 5, the output electrical signal will have a potential or voltage that is logarithmically proportional to the photo-current generated by light detection at the light sensor during operation of the high light level electronics 20. The common electronics 10 can use this proportionality to determine the intensity of the light detected at the pixel 12 during operation of the high light level electronics 20.

The common electronics 10 can combine the data transferred from the low light level electronics 18 with the data transferred from the high light level electronics 20 to determine a value for the total intensity of light detected at the pixel 12 during the data acquisition. The combination of the data can take place in the digital domain. The data from the low light level electronics can be the lowest-significant bits and the data from the high light level electronics can be the most significant bits. When the output electrical signal from the high light level electronics is acquired with logarithmic compression, the ADC can quantize the "compressed" signal, and the "decompression" into a linear signal can be done in the digital domain.

After or concurrently with the transfer of the transfer of the acquired data to the common electronics 10, the common electronics 10 can prepare the pixel 12 for the next data acquisition cycle.

Figure 6:
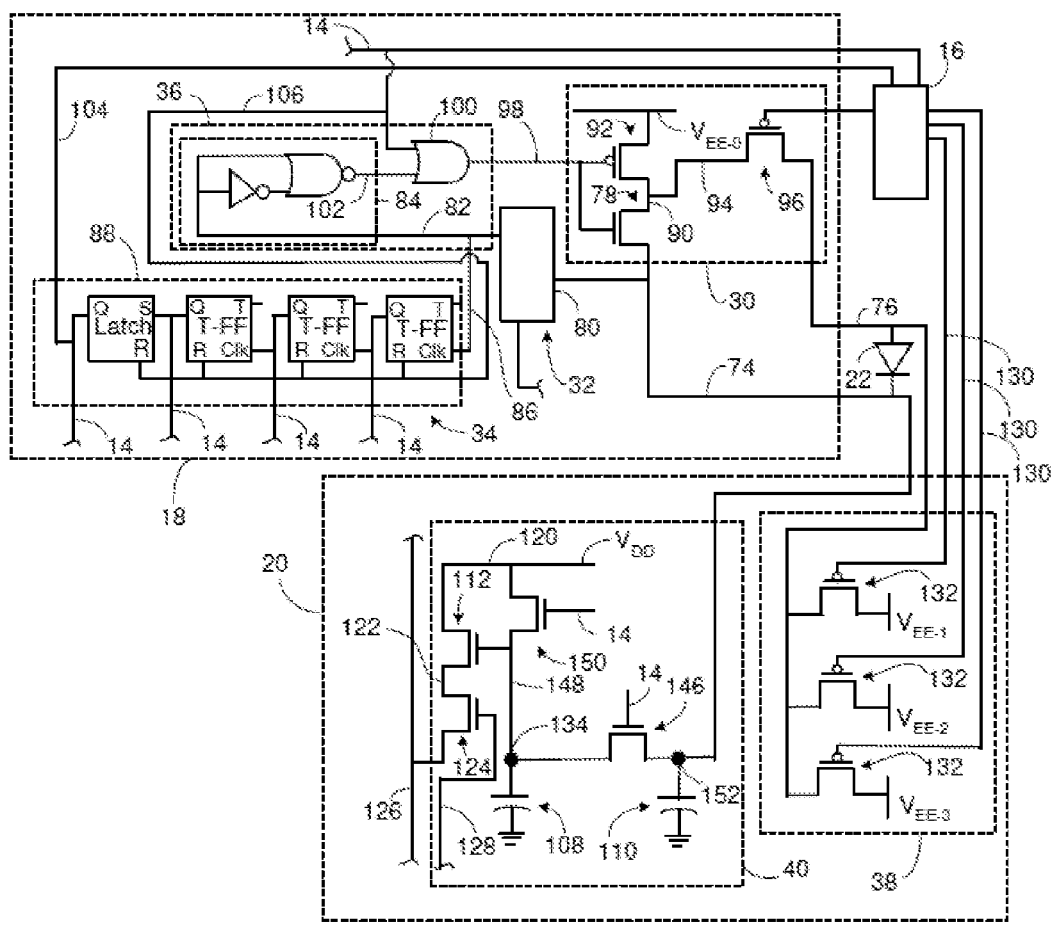
FIG. 6 is a schematic of pixel electronics that include an alternative configuration for the high light level electronics of FIG. 5.

Other configurations of the high light level electronics and the low light level electronics are possible. For instance, FIG. 6 is a schematic of pixel electronics having an alternative configuration for the high light level electronics shown in FIG. 5. In FIG. 6, the second bias module shown in the FIG. 5 is modified such that a Tx transistor 146 is positioned along the cathode line 74 between the first polarized capacitor 108 and the second polarized capacitor 110. For instance, the cathode line 74 is in electrical communication with the source of the Tx transistor 146 and a second cathode line 148 is in electrical communication with the drain of the Tx transistor 146, the first polarized capacitor 108, the gate of the first transistor 112 and the drain of a reset transistor 150. The gates of the Tx transistor 146 and the reset transistor 150 are in electrical communication with external lines 14. As a result, the common electronics can turn the Tx transistor 146 and the reset transistor 150 on and off. The Tx transistor 146 can be a transfer gate that blocks or allows transfer of charge from the light sensor to the first polarized capacitor 108.

As noted above, preparation of the pixel for data acquisition can include applying the potential of the positive source ($V_{DD}$) to the cathode line 74. To apply the potential of the positive source ($V_{DD}$) to the cathode line 74, the common electronics turn off the read transistor 124, turn on the reset transistor 150, and turn on the Tx transistor 146. Before the data acquisition occurs and after applying the potential of the positive source ($V_{DD}$) to the cathode line 74, the common electronics leave the read transistor 124 off, turn off reset transistor 150, and turn the Tx transistor 146 off. The data acquisition occurs with this configuration of the read transistor 124, reset transistor 150, and Tx transistor 146. As a result, charge from photon detection by the light sensor is stored at node 152 during data acquisition.

After or concurrently with termination of the data acquisition and before transfer of the data to the common electronics, the common electronics leave the read transistor 124 off, leave the reset transistor 150 off, and turn on the Tx transistor 146 to transfer the charge stored at node 152 during data acquisition is transferred to the storage node 134 (e.g., a floating diffusion). Accordingly, the Tx transistor can act as a shutter.

After or concurrently with transfer of the accumulated charge to the storage node 134 (e.g., a floating diffusion), the common electronics can initiate transfer of the data to the common electronics by turning the read transistor 124 on, leaving the reset transistor 150 off, and turning the Tx transistor 146 off. During transfer of the output signal to the common electronics, the high light electronics apply an output electrical signal to the column bus 126. The potential or voltage of the output electrical signal is proportional to the intensity of the light detected by the light sensor 22.

Figure 7:
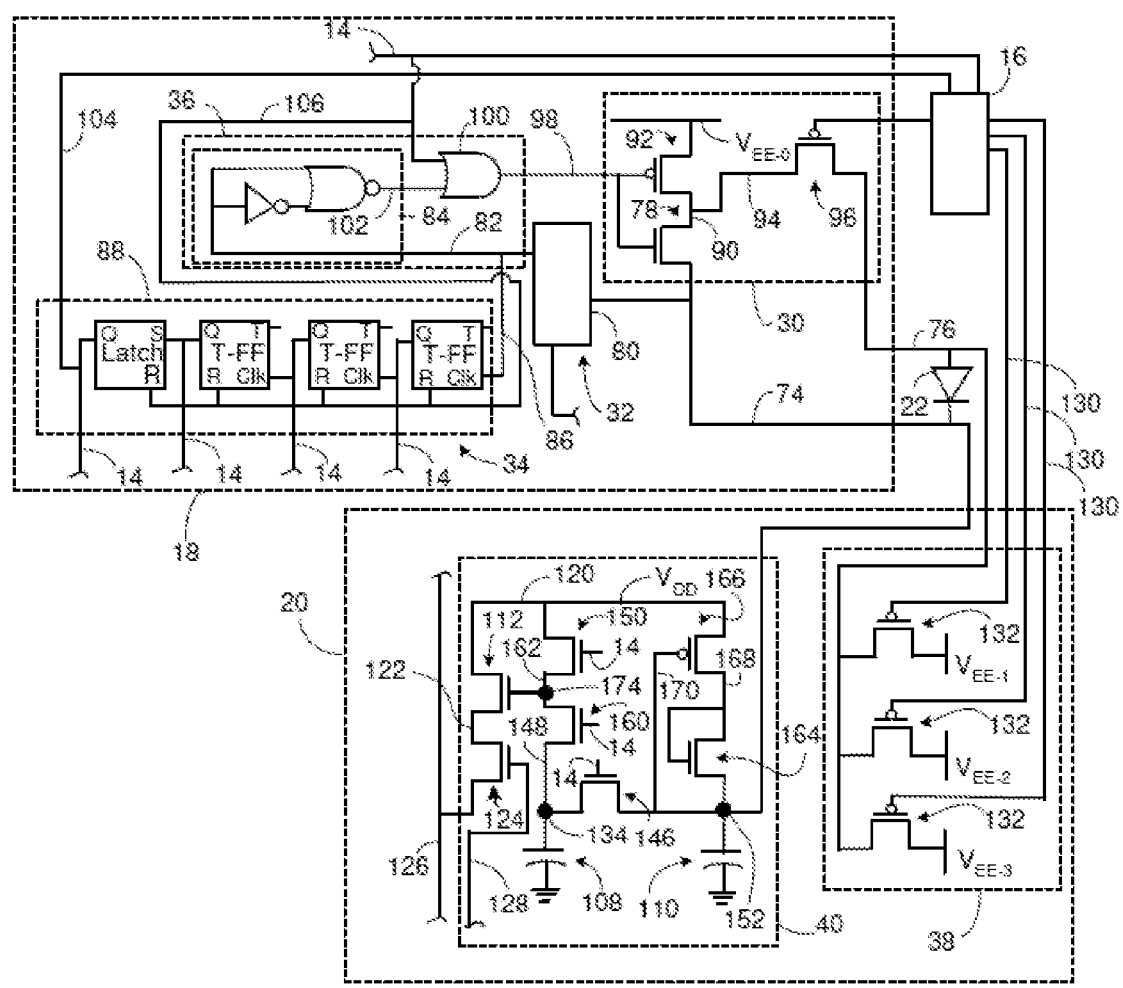
FIG. 7 is a schematic of pixel electronics that include an alternative configuration for the high light level electronics of FIG. 5.

FIG. 7 is a schematic of pixel electronics that include an alternative configuration for the high light level electronics of FIG. 5. In FIG. 7, the second cathode line 148 is in electrical communication with the drain of a pass transistor 160 that can isolate node 134 from the reset transistor 150 and the first transistor 112. A third transistor line 162 provides electrical communication between the source of the pass transistor 160, the drain of the reset transistor 150, and the gate of the first transistor 112.

The cathode line 74 is in electrical communication with the source of a third transistor 164 which performs a logarithmic conversion of the photo-current to voltage. The potential supply line 120 is in electrical communication with the source of a fourth transistor 166 that can be a p-channel transistor or a PMOS switch. A fourth transistor line 168 provides electrical communication between the drain of the third transistor 164, the drain of the fourth transistor 164, and the gate of the third transistor 164. The cathode line 74 is also in electrical communication with the gate of the fourth transistor 166. The gates of the Tx transistor 146, the reset transistor 150, and the pass transistor 160 are in electrical communication with external lines 14. As a result, the common electronics can turn the Tx transistor 146, the reset transistor 150, and the pass transistor 160 on and off.

As noted above, preparation of the pixel for data acquisition can include applying the potential of the positive source ($V_{DD}$) to the cathode line 74. To apply the potential of the positive source ($V_{DD}$) to the cathode line 74, the common electronics can turn off the read transistor 124, turn on the Tx transistor 146, turn on reset transistor 150, and turn on the pass transistor 160. As a result, node 134 and node 152 are set at $V_{DD}$.

The pixel electronics of FIG. 7 can be used to perform data acquisition for the pixels in different rows of the pixel array (row by row basis) or to concurrently acquire data from the pixels in different rows of the pixel array (global basis). Before or concurrently with the start of data acquisition and after applying the potential of the positive source ($V_{DD}$) to the cathode line 74, the common electronics leave the read transistor 124 off, turn the Tx transistor 146 off, turn off reset transistor 150, and turn off the pass transistor 160. As a result, node 174, node 134 and node 152 are floating. The data acquisition occurs with this configuration of the read transistor 124, Tx transistor 146, reset transistor 150, and pass transistor 160. As a result, charge from photon detection by the light sensor is stored at node 152 (i.e. second polarized capacitor 110) during data acquisition. The charge accumulation lowers the voltage at the second polarized capacitor 110. In some instances, the voltage at the second polarized capacitor 110 decreases sufficiently to that the fourth transistor 166 turns ON. If and/or when the fourth transistor 166 is turned on, node 152 is no longer floating since the fourth transistor 166 and third transistor 164 are now turned on. As a result, a conductive pathway is established between the potential supply line 120 and the second polarized capacitor 110. In this configuration, the fourth transistor 166 acts as a resistive load and the voltage at node 152 becomes the logarithm of the current flowing through the third transistor 164. In this instance, if the photo-current is sufficiently small, the voltage at node 152 can increase up to the value at which transistor 166 is switched off again.

In some instances, the voltage at the second polarized capacitor 110 does not decrease sufficiently to turn on the fourth transistor 166 at any time during the data acquisition time. In these instances, the output electrical signal that will be loaded onto on the column bus 126 is proportional to the number of charges stored at node 152. In contrast, when the voltage at the second polarized capacitor 110 decreases sufficiently to turn on the fourth transistor 166, the output electrical signal that will be loaded onto on the column bus 126 is proportional to the logarithm of the photo-current flowing third transistor 164.

The common electronics can terminate data acquisition by leaving the read transistor 124 off, turning the Tx transistor 146 on, leaving the reset transistor 150 off, and leaving the pass transistor 160 off. In this configuration, the charge stored at node 152 is transferred to node 134. After or concurrently with expiration of the time interval sufficient to transfer the stored charge signal from node 152 to node 134, the common electronics turn off the Tx transistor 146. When operating the pixel circuit of FIG. 7 with an APD as the light sensor, the potential pulse applied to the anode of the APD as a result of opening and closing one or more of the bias selection transistors 132 can be started concurrently or substantially concurrently with the turning the Tx transistor 146 off in order to start the data acquisition and can end concurrently or substantially concurrently with the Tx transistor 146 to terminate data acquisition.

The common electronics transfer the acquired data from the pixel to the common electronics on a row-by-row basis. The common electronics initiate the data transfer by turning the read transistor 124 on, leaving the Tx transistor 146 off, leaving the reset transistor 150 off, and leaving the pass transistor 160 off for each of the pixels in a row. In this configuration, the primary electrical signal loaded onto on the column bus 126 is the dark current level ($V_{DD}$), stored in node 174 prior to data acquisition, amplified through first transistor 112. The common electronics can include a first capacitor (not shown) that is connected to the column bus and that is charged by receipt of the primary electrical signal.

To continue the data transfer, the common electronics switch on pass transistor 160 to allow the signal stored at node 134 to be transferred to node 174, amplified by first transistor 112, and loaded onto the column bus 126 as the output electrical signal. The common electronics can include a second capacitor (not shown) that is connected to the column bus and that is charged by receipt of this output electrical signal. The common electronics can subtract the primary electrical signal from the output electrical signal to generate a correlated double sampling (CDS-signal) that the common electronics can process in the analog or digital domain. If the voltage level of the CDS-signal corresponds to a value at node 152 for which the fourth transistor 166 remains off, then the CDS-signal is linearly proportional to the number of charges stored at node 152 and the common electronics can use this proportionality to determine the intensity of light received at the light sensor during operation of the high light level electronics. In contrast, when the voltage level of the CDS-signal corresponds to a value at node 152 that is equal or larger than that for which the fourth transistor 166 turns ON, then the CDS-signal signal is proportional to the logarithm of the photo-current flowing through the third transistor 164. The common electronics can use this proportionality to determine the intensity of light received at the light sensor during operation of the high light level electronics. Once the data transfer is completed for a row of pixels, the data transfer can be repeated for another row of pixels until the data acquired on a row-by-row basis or on a global basis is transferred to the common electronics.

Optionally, after transfer of the data stored at node 134, the common electronics may switch on reset transistor 150, and read the potential at node 174 amplified by first transistor 112, which corresponds to a dark current value after data acquisition, which can be used in conjunction with the dark current value stored prior to signal acquisition, to further improve the noise reduction from the actual signal. After the data transfer is done, read transistor 124 can be turned off. The turning on of the reset transistor 150 can be done as part of the reset of the potentials at node 174, node 134 and 152 node, required to prepare the pixel for the next data acquisition cycle.

Figure 8:
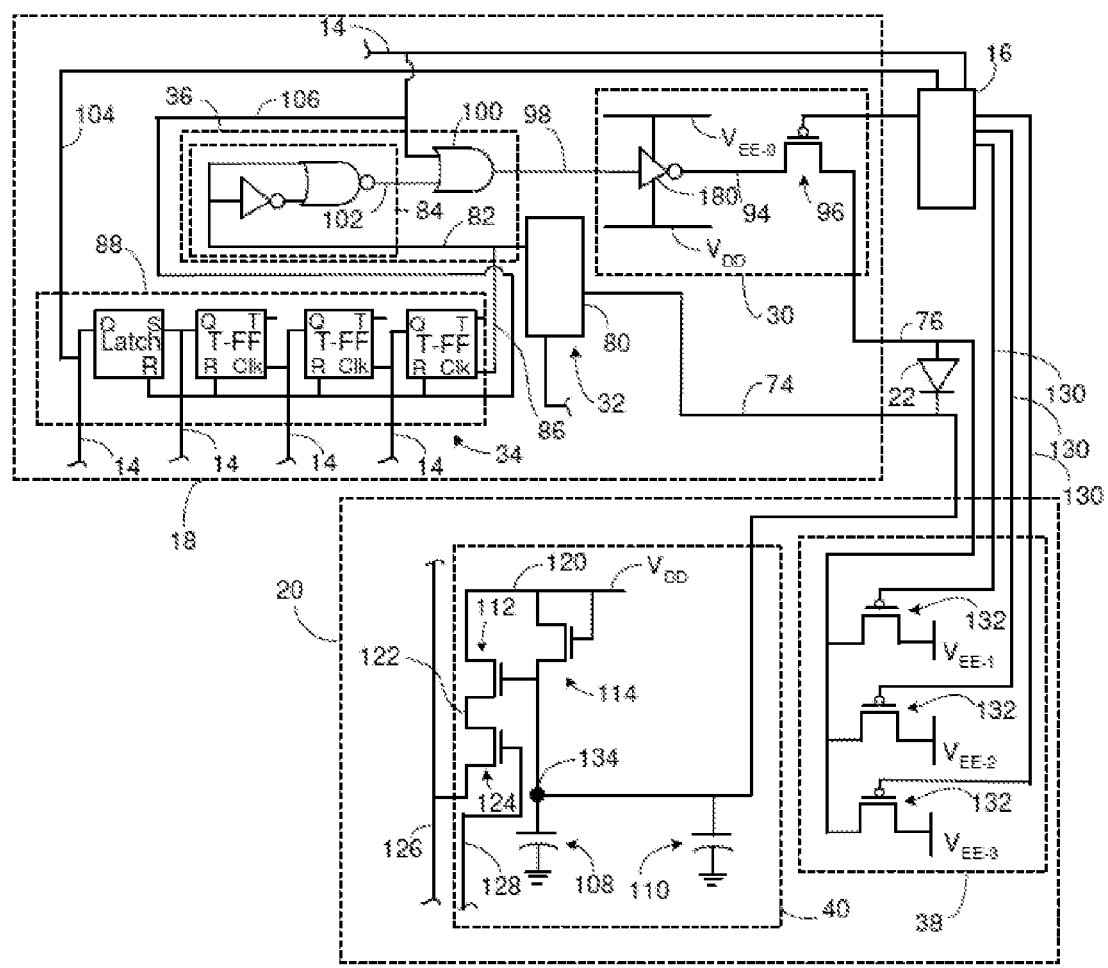
FIG. 8 is a schematic of pixel electronics that include an alternative configuration for the low light level electronics of FIG. 5.

FIG. 8 is a schematic of pixel electronics that include an alternative configuration for the low light level electronics of FIG. 5 in combination with the high light level electronics from FIG. 6. In FIG. 8, the inverter defined by the p-channel transistor 92 and the n-channel transistor 78 of FIG. 5 are replaced with an inverter 180. One of the sources for inverter 180 is at the potential of the low light potential source (labeled $V_{EE-0}$) and the other source is at the potential of the positive source ($V_{DD}$). The inverter 180 is configured such that the inverter 180 applies $V_{EE-0}$ to the inverter output line 94 when a zero is on the inverter input line 98 and applies $V_{DD}$ to the inverter output line 94 when a zero is on the inverter input line 98. As a result, the low light level electronics operate as disclosed in the context of FIG. 5.

Figure 9:
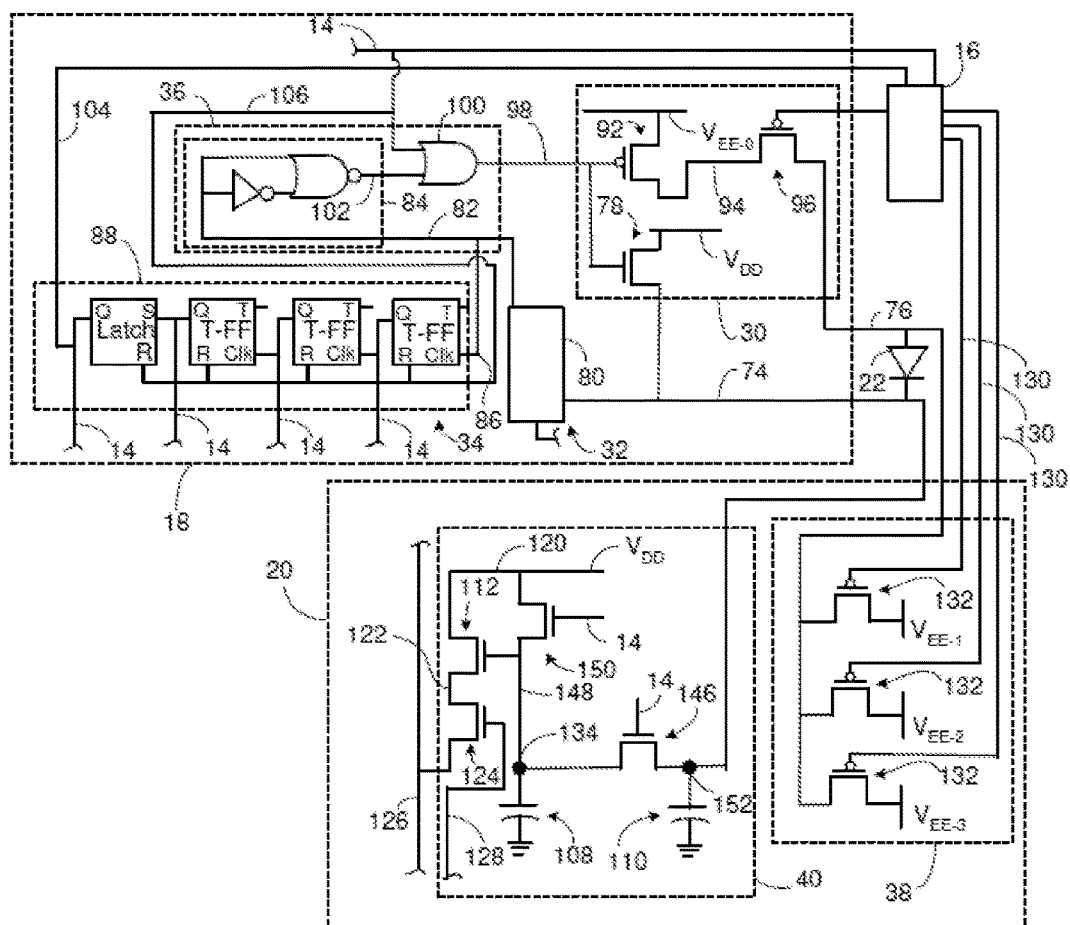
FIG. 9 is a schematic of pixel electronics that include an alternative configuration for the low light level electronics of FIG. 5.

FIG. 9 is a schematic of pixel electronics that include an alternative configuration for the low light level electronics of FIG. 5 in combination with the high light level electronics from FIG. 6. Rather than the n-channel transistor 78 being connected to the transistor line 90, the source of the n-channel transistor 78 is connected to the positive source ($V_{DD}$) and is accordingly at the potential of the positive source ($V_{DD}$). When a zero is on the inverter input line 98, the p-channel transistor 92 is on and the re-channel transistor 78 is off. In this configuration, $V_{EE-0}$ is applied to the inverter output line 94. However, when a one is on the inverter input line 98, the p-channel transistor 92 is off and the n-channel transistor 78 is on. As a result, $V_{DD}$ is applied to the cathode line 74 and the inverter output line 94 is deprived of $V_{EE-0}$. The deprivation of $V_{EE-0}$ to the anode of the light sensor causes quenching of the light sensor. As is evident from the description of FIG. 5, a one is applied to the inverter output line 94 during pixel preparation and after detection of a photon at the light sensor. As a result, during use of the low light level electronics for data acquisition, the light sensor 22 is quenched and the cathode line 74 returned to $V_{DD}$ during pixel preparation and also after detection of a photon at the light sensor. In some instances, the high light level operation takes place while p-channel transistor 92 is on and the n-channel transistor 78 is off, thus the potential on line 74 is determined by the light intensity impinging on light sensor 22.

Figure 10A:
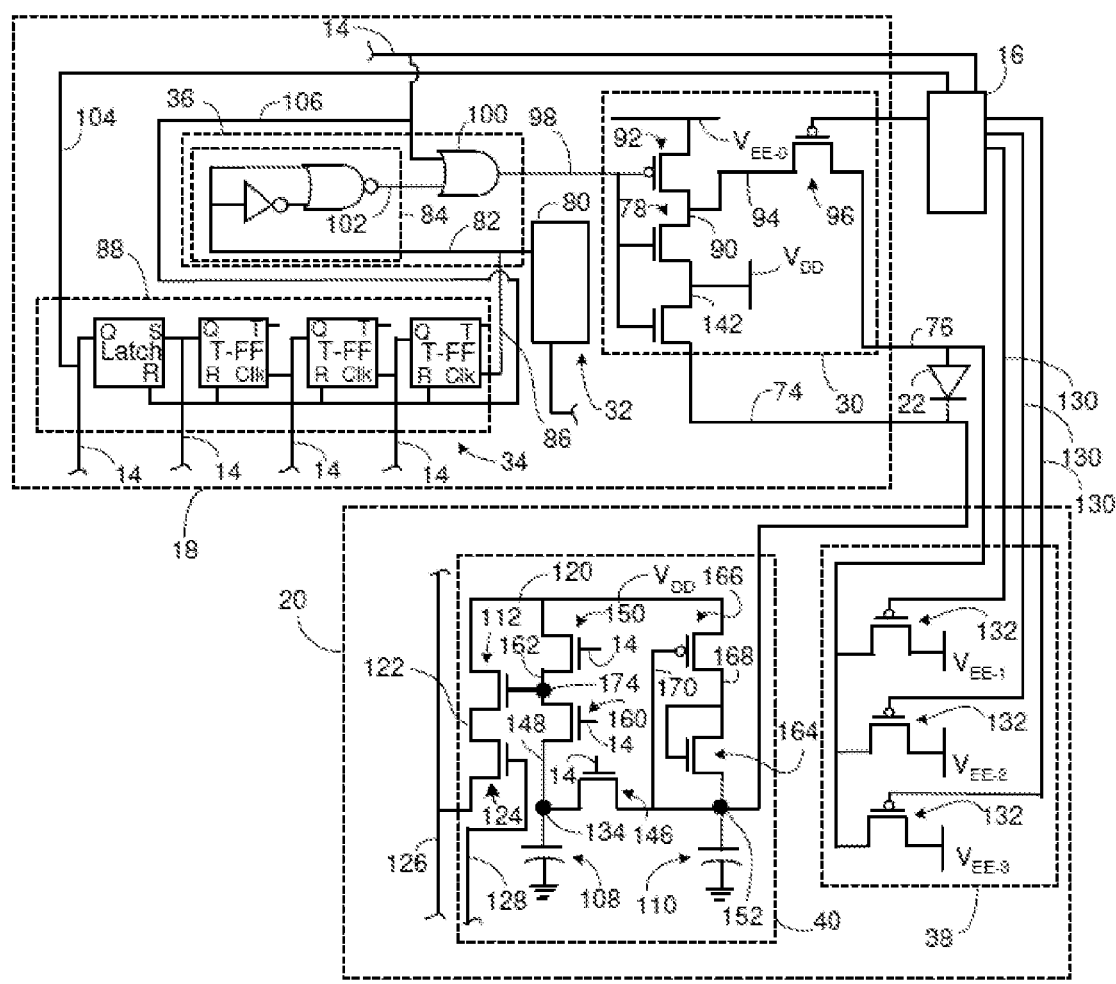
FIG. 10A-B show schematics of pixel electronics that include alternative configurations for the low light level electronics of FIG. 5.
Figure 10B:
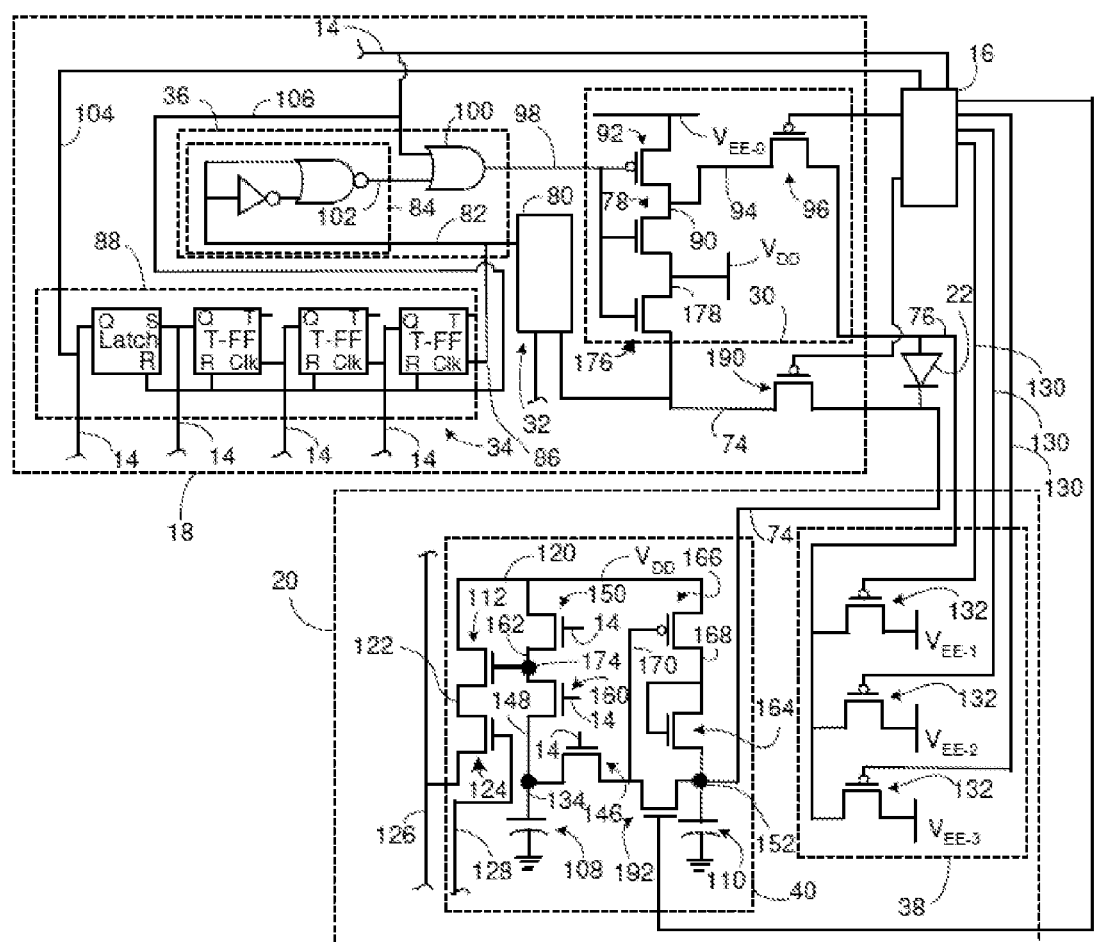

FIG. 10A-B show schematics of pixel electronics that include alternative configurations for the low light level electronics of FIG. 5 in combination with the high light level electronics from FIG. 7. The cathode line is in electrical communication with the drain of a second n-channel transistor 176. A fifth transistor line 178 provides electrical communication between the source of the n-channel transistor 78 and the source of the second n-channel transistor 176. The fifth transistor line 178 is connected to the positive source ($V_{DD}$) and is accordingly at the potential of the positive source ($V_{DD}$). The gate of the second n-channel transistor 176 is in electrical communication with the inverter input line 98. As a result, the second n-channel transistor 176 turns on and off in conjunction with the n-channel transistor 78. Accordingly, when a zero is on the inverter input line 98, the p-channel transistor 92 is on, the n-channel transistor 78 is off, and the second n-channel transistor 176 is off. In this configuration, $V_{EE-0}$ is applied to the inverter output line 94. When a zero is on the inverter input line 98, the p-channel transistor 92 is off, the n-channel transistor 78 is on, and the second n-channel transistor 176 is on. In this configuration, $V_{DD}$ is applied to the inverter output line 94 and also to the cathode line 74. As a result, this configuration quenches the light sensor 22 and returns the cathode line 74 to $V_{DD}$. As is evident from the description of FIG. 5, a one is applied to the inverter output line 94 during pixel preparation and in response to detection of a photon at the light sensor. As a result, during use of the low light level electronics for data acquisition, the light sensor is quenched and the cathode line 74 returned to $V_{DD}$ during pixel preparation and also after detection of a photon at the light sensor.

Optionally, isolation transistors can be used to isolate the low light level electronics and high light electronics during data acquisition (see, FIG. 10B). For instance, the source and drain of a first isolation transistor 190 are positioned along the cathode line 74 and the gate of the first isolation transistor 190 is in electrical communication with the pixel controller 16. The source and drain of a second isolation transistor 192 are positioned along the cathode line 74 and the gate of the second isolation transistor 192 is in electrical communication with the pixel controller 16. A portion of the cathode line 74 provides electrical communication between a terminal of the second polarized capacitor 110, the source of the first isolation transistor 190, the source of the second isolation transistor 192, and the cathode of the light sensor 22. The pixel controller 16 can turn on the first isolation transistor 190 and the second isolation transistor 192 when $V_{DD}$ is applied to the cathode line 74 during preparation of the pixel.

When the low light level electronics are used for data acquisition, the pixel controller 16 turns on the first isolation transistor 190 and turns off the second isolation transistor 192. In this configuration, the low light level electronics have electrical access to electronic output from the cathode of the light sensor 22 while cutting off the access of the high light level electronics to the cathode of the light sensor 22. Concurrently with or substantially concurrently with the pixel controller 16 switching from using the low light level electronics for data acquisition to using the high light level electronics for data acquisition, the pixel controller 16 turns off the first isolation transistor 190 and turns on the second isolation transistor 192. In this configuration, the high light level electronics have electrical access to the cathode of the light sensor while cutting off the access of the low light level electronics to the cathode of the light sensor 22. Accordingly, the low light level electronics do not influence operation of the high light electronics during use of the high light electronics to acquire the data. Likewise, the high light level electronics do not influence operation of the high light electronics during use of the high light electronics to acquire the data. In the pixel electronics of FIG. 10, isolation of the high light level electronics from the low light level electronics during use of the high light electronics to acquire data may be more important to proper functioning of the circuit than the reverse condition. As a result, the second isolation transistor 192 may be optional in the pixel electronics of FIG. 10.

As noted above, during preparation of the pixel, $V_{DD}$ is applied to the cathode line 74 from the low light level electronics rather than from the high light level electronics. As a result, the high light level electronics of FIG. 10 can be operated as described in the context of FIG. 7 but with using the low light electronics to apply $V_{DD}$ to the cathode line 74 during preparation of the pixel. Since the $V_{DD}$ is applied to the cathode line 74 from the low light level electronics, the reset transistor 150 may be optional in that it may not be required for the application of $V_{DD}$ to the cathode line 74.

Figure 11:
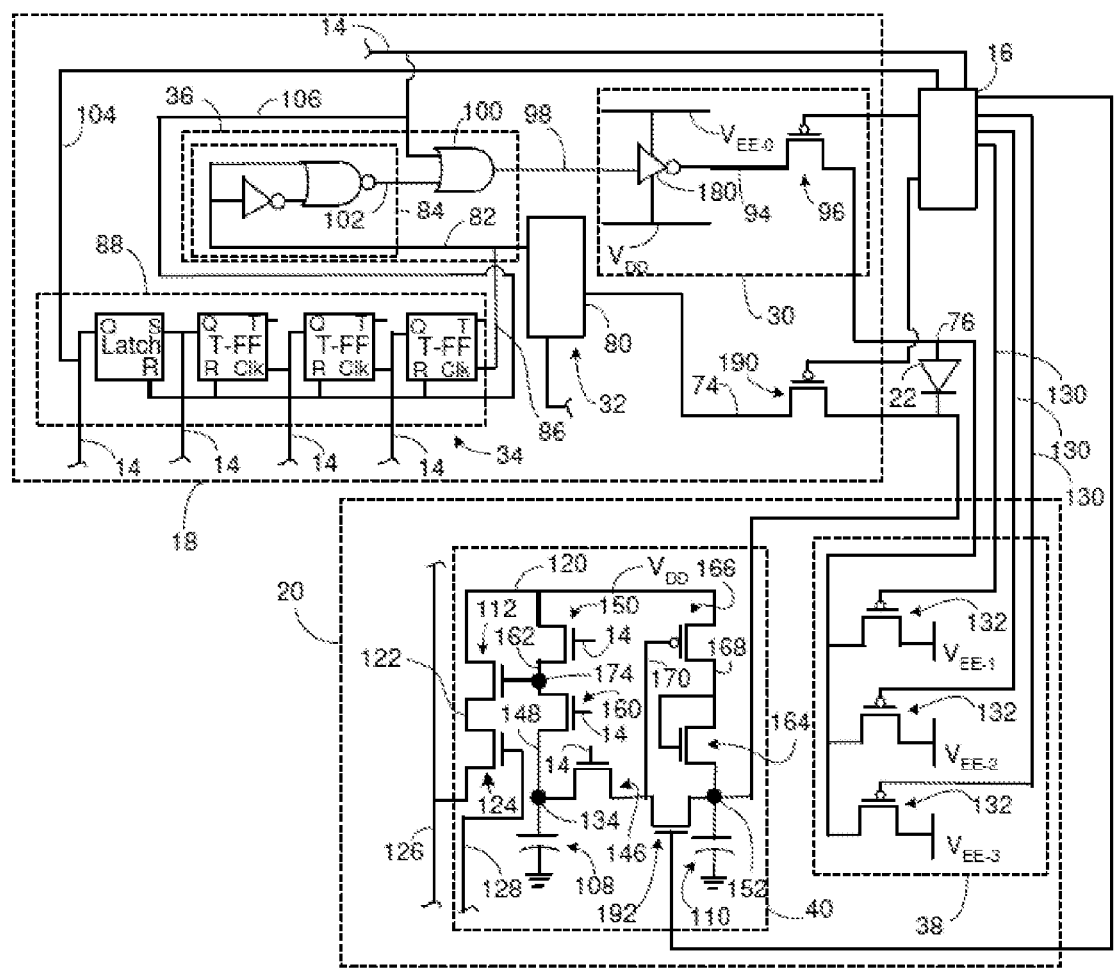
FIG. 11 is a schematic of pixel electronics where isolation transistors are used with the pixel electronics that include the low light level electronics from FIG. 8 and the high light level electronics from FIG. 7.

One or more of the isolation transistors can be used in conjunction with any of the pixel electronics disclosed above in order isolate the low light level electronics from the high light level electronics when using the low light level electronics for data acquisition and/or to isolate the high light level electronics from the low light level electronics when using the low light level electronics for data acquisition. For instance, FIG. 11 is a schematic of pixel electronics where isolation transistors are used with the pixel electronics that include the low light level electronics from FIG. 8 and the high light level electronics from FIG. 7. When the pixel electronics include a first isolation transistor 190 and/or a second isolation transistor 192, the pixel controller can operate the first isolation transistor 190 and/or second isolation transistor 192 as described in conjunction with FIG. 10.

As is evident from FIG. 8 through FIG. 10, it is possible to generate pixel electronics using different combinations of the low light level electronics and the high light level electronics disclosed above. For instance, any of the high light level electronics disclosed in FIG. 5 through FIG. 7 can be used with any of the low light level electronics disclosed in FIG. 8 through FIG. 10. As an example, the low light level electronics of FIG. 8 or FIG. 9 can be used in combination with the high light level electronics of FIG. 7 or FIG. 10.

Isolation transistors can be used in combination with any of the above examples of pixel electronics. For instance, FIG. 11 is a schematic of pixel electronics where isolation transistors 190 are used with the pixel electronics from FIG. 10. The source and drain of a first isolation transistor 190 is positioned along the cathode line 74 and the gate of the first isolation transistor 190 is in electrical communication with the pixel controller 16. The source and drain of a second isolation transistor 192 is positioned along the cathode line 74 and the gate of the second isolation transistor 192 is in electrical communication with the pixel controller 16. A portion of the cathode line 74 provides electrical communication between a terminal of the second polarized capacitor 110, the source of the first isolation transistor 190, the source of the second isolation transistor 192, and the cathode of the light sensor 22. The pixel controller 16 can turn on the first isolation transistor 190 and the second isolation transistor 192 during preparation of the pixel. When the data acquisition cycle is started, the pixel controller 16 turns on the first isolation transistor 190 and turns off the second isolation transistor 192. When the pixel controller 16 transitions from using the low light level electronics for data acquisition to using the high light level electronics for data acquisition, the pixel controller 16 turns off the first isolation transistor 190 and turns on the second isolation transistor 192. In this configuration, the low light level electronics have electrical access to electronic output from the cathode of the light sensor 22 while cutting off the access of the high light level electronics to the cathode of the light sensor 22. When the pixel controller 16 transitions from using the low light level electronics for data acquisition to using the high light level electronics for data acquisition, the pixel controller 16 turns off the first isolation transistor 190 and turns on the second isolation transistor 192. In this configuration, the high light level electronics have electrical access to the cathode of the light sensor while cutting off the access of the low light level electronics to the cathode of the light sensor 22. Accordingly, the biasing and access to the output signals of the Avalanche Photo-Diode (APD) can be decoupled for each mode of operation.

Isolation transistors can be used in combination with any of the above examples of pixel electronics. For instance, FIG. 11 is a schematic of pixel electronics where isolation transistors 190 are used with the pixel electronics from FIG. 10. The source and drain of a first isolation transistor 190 is positioned along the cathode line. The source and drain of a second isolation transistor 192 is positioned along the cathode line 74. The same line provides electrical communication between the pixel controller 16 and the gate of the second isolation transistor 192 and the gate of the first isolation transistor 190. As is evident from FIG. 11, the first isolation transistor 190 can be a p-channel transistor and the second isolation transistor 192 can be an n-channel transistor. As a result, when the first isolation transistor 190 is on, the second isolation transistor 192 is off. Additionally, when the first isolation transistor 190 is off, the second isolation transistor 192 is on. When the data acquisition cycle is started, the pixel controller 16 turns on the first isolation transistor 190 and turns off the second isolation transistor 192. In this configuration, the low light level electronics have electrical access to electronic output from the cathode of the light sensor 22 while cutting off the access of the high light level electronics to the cathode of the light sensor 22. When the pixel controller 16 transitions from using the low light level electronics for data acquisition to using the high light level electronics for data acquisition, the pixel controller 16 turns off the first isolation transistor 190 and turns on the second isolation transistor 192. In this configuration, the high light level electronics have electrical access to the cathode of the light sensor while cutting off the access of the low light level electronics to the cathode of the light sensor 22.

Suitable transistors for use as the transistors of the pixel electronics disclosed above include, but are not limited to, n-type and p-type MOSFETs (CMOS), made with bulk silicon substrates, or made with thick-film Silicon-On-Insulator (SOI) substrates, or made with thin-film SOI substrates, including Fully-Depleted MOSFETs, Tunnel MOSFETs, Bipolar Junction Transistors, Heterojunction Bipolar Transistors (HBTs).

The above description of operation of the pixel electronics is based on a steady state application of bias to the light sensor; however, a pulsed bias can also be applied to the light sensor. The pulsed bias can be created by opening the bias transistor 96 or one or more of selection transistors 132 as is needed to apply a pulse of the desire bias to the light sensor for the desired duration. The duration of the pulse can be the data acquisition time. When the pixel electronics include a Tx transistor 146, the pulse can coincide with the period of time which the Tx transistor 146 is off. The use of a pulsed bias during the data acquisition is that during data acquisition there is an internal gain of an APD that provides gain to the photo-detected signal. However, this gain does not occur when the applied bias is not applied. Since bias is not applied when the Tx transistor 146 is turned on to allow the transfer of charge from the second polarized capacitor 110 to the first polarized capacitor 108, light that is absorbed at the light sensor during this time occurs without without avalanche gain. As a result, the light absorbed during this time has minimal impact on the overall signal being transferred to capacitor 108.

The above schematics result in "active pixels" in the sense that the term "active" means that there is amplification inside the pixel. In the commonly used analog "Active Pixel Sensors", found in cell phones for example, the amplification is provided by transistor 112. In the above new pixels, the high light level electronics contains the same type of amplifier, but the APD light sensor also provides amplification when operating by the high light level electronics. As a result, when the light sensor is an APD, the pixels have a double amplification because transistor 112 amplifies a signal that is itself already amplified by avalanche of the photo-generated signal. When operating the low light level electronics, an APDs can provide a non-linear amplification, in which the generation of a single electron leads to a macroscopic voltage swing. Consequently, an image sensor consisting of a 2D array of the pixels results an active pixel sensor.

Although the above description uses the notations $V_{DD}$ and $V_{EE}$ to describe different potentials, these potential represented by $V_{DD}$ and $V_{EE}$ can have the conventional meaning assigned to these abbreviations or can be at other potential levels. For instance, $V_{EE}$ can refer to 0 volts, or negative 3 volts, or negative 5 volts.

Although the high light level electronics are illustrated as having three second potential sources, the high light level electronics can include more than three second potential sources or a few as one second potential source.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. A light-sensing device, comprising:
a pixel array that includes multiple pixels each includes a light sensor, each of the light sensors being associated with different pixel electronics,
the pixel electronics each including low light level electronics in communication with the associated light sensor and high light level electronics in communication with the associated light sensor,
the pixel electronics acquiring data from the associated light sensor,
the pixel electronics including a pixel controller configured to transition the pixel electronics between using the high light level electronics to acquire the data and using the low light level electronics to acquire the data, and
the pixel electronics are included in the associated pixel.

2. The device of claim 1, wherein the transition occurs during a data acquisition time.

3. The device of claim 2, wherein the data acquisition time is an image acquisition time.

4. The device of claim 1, wherein the transition is from use of the low light level electronics to acquire the data to use of the high light level electronics to acquire the data.

5. The device of claim 4, where the data acquisition begins with use of the low light level electronics to acquire the data and the transition occurs before the data acquisition is terminated.

6. The device of claim 1, wherein the low light level electronics count photons detected at the associated light sensor and the high light level electronics measure an intensity of light detected at the associated light sensor.

7. The device of claim 6, wherein the low light level electronics output digital signals indicating the number of photons detected at the associated light sensor to common electronics that are common to multiple different pixels.

8. The device of claim 6, wherein the high light level electronics output an analog signal with a potential and/or voltage that is proportional to the intensity of light detected at the associated light sensor to common electronics that are common to multiple different pixels.

9. The device of claim 1, wherein the high light level electronics are each an analog circuit and the low light level electronics are each a digital circuit.

10. The device of claim 1, wherein the low light level electronics are disabled when the pixel electronics use the high light level electronics to acquire the data.

11. The device of claim 1, wherein the pixel electronics transfer from using the low light level electronics to using the high light level electronics in response to one or more intensity conditions being satisfied, and the satisfaction of at least one of the one or more intensity conditions indicates that an intensity of light detected at the associated light sensor during use of the low light level electronics to acquire the data satisfies one or more conditions.

12. The device of claim 11, wherein the one or more conditions include the associated light sensor detecting a number of photons in excess of an upper limit before the expiration of a data acquisition time.

13. The device of claim 12, wherein the low light level electronics communicate the satisfaction of the one or more intensity conditions to the pixel controller, the pixel controller transitions the pixel electronics from using the low light level electronics to acquire the data to using the high light level electronics to acquire the data in response to receipt of the communication of the satisfaction of the one or more intensity conditions.

14. The device of claim 1, wherein a different bias level is applied across the associated light sensor during operation of the low light level electronics to acquire the data than in applied across the light sensor during operation of the high light level electronics to acquire the data.

15. The device of claim 1, wherein the light sensors are quenched between receipt of different photons at the light sensor while operating the low light level electronics to acquire the data but are not quenched between receipt of different photons at the light sensor while operating the high light level electronics to acquire the data.

16. The device of claim 1, wherein the high light level electronics are each an analog circuit and the low light level electronics are each a digital circuit.

* * * * *